US010732557B2

(12) United States Patent
Iida

(10) Patent No.: US 10,732,557 B2
(45) Date of Patent: Aug. 4, 2020

(54) IMAGE FORMING SYSTEM CAPABLE OF NOTIFYING SHORTAGE OF CONSUMABLE, INFORMATION PROCESSING APPARATUS, NOTIFICATION METHOD

(71) Applicant: KYOCERA Document Solutions Inc., Osaka-shi, Osaka (JP)

(72) Inventor: Daichi Iida, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/424,942

(22) Filed: May 29, 2019

(65) Prior Publication Data

US 2019/0369541 A1 Dec. 5, 2019

(30) Foreign Application Priority Data

May 30, 2018 (JP) .................... 2018-103637

(51) Int. Cl.
*G03G 15/00* (2006.01)
*G06F 3/12* (2006.01)
*H04N 1/00* (2006.01)

(52) U.S. Cl.
CPC ......... *G03G 15/556* (2013.01); *G06F 3/1219* (2013.01); *G06F 3/1239* (2013.01); *H04N 1/00408* (2013.01); *H04N 1/00477* (2013.01)

(58) Field of Classification Search
CPC .... G03G 15/553; G03G 15/556; G06F 3/121; G06F 3/1219; G06F 3/1239; G06F 3/1263; H04N 1/00408; H04N 1/00477
See application file for complete search history.

(56) References Cited

U.S. PATENT DOCUMENTS

| 2010/0125759 A1* | 5/2010 | Roulland | G03G 15/5075 714/46 |
| 2010/0214602 A1* | 8/2010 | Moriwaki | G03G 15/553 358/1.15 |
| 2018/0196626 A1* | 7/2018 | Mutsuno | G06F 3/1234 |

FOREIGN PATENT DOCUMENTS

JP 2009118108 A 5/2009

* cited by examiner

*Primary Examiner* — Carla J Therrien
(74) *Attorney, Agent, or Firm* — Alleman Hall Creasman & Tuttle LLP

(57) ABSTRACT

An image forming system includes: a first notification processing portion that notifies, of a shortage of a consumable, a user of an information processing apparatus that is a transmission source of a first print job which is, among print jobs stored in a storage portion, a print job for which the consumable necessary for execution of the print job will become insufficient during a stop possible period of the print job, the stop possible period being a time period in which execution of the print job can be stopped; and a second notification processing portion that notifies, of the shortage of the consumable and presence of the first print job, a user of an information processing apparatus that is a transmission source of a second print job which is, among the stored print jobs, executed later than the first print job in the execution order and uses the consumable.

9 Claims, 6 Drawing Sheets

IMAGE FORMING SYSTEM CAPABLE OF NOTIFYING SHORTAGE OF CONSUMABLE, INFORMATION PROCESSING APPARATUS, NOTIFICATION METHOD

INCORPORATION BY REFERENCE

This application is based upon and claims the benefit of priority from the corresponding Japanese Patent Application No. 2018-103637 filed on May 30, 2018, the entire contents of which are incorporated herein by reference.

BACKGROUND

The present disclosure relates to an image forming system, an information processing apparatus, and a notification method.

There is known an image forming apparatus, such as a printer, that can execute a print job using consumables such as sheets and developer. In addition, as a related technology, there is known an image forming apparatus that determines whether or not any of the consumables will become insufficient at a time when, during an execution of a print job, a subsequent print job is input, and upon determining that any of the consumables will become insufficient, notifies the fact.

SUMMARY

An image forming system according to an aspect of the present disclosure includes a storage processing portion, a print control portion, a first notification processing portion, and a second notification processing portion. The storage processing portion stores print jobs transmitted from information processing apparatuses, into a storage portion. The print control portion controls an execution order of the print jobs stored in the storage portion for execution by an image forming apparatus. The first notification processing portion notifies a user of an information processing apparatus that is a transmission source of a first print job, of a shortage of a consumable, the first print job being, among the print jobs stored in the storage portion, a print job for which the consumable that is necessary for execution of the print job will become insufficient during a stop possible period of the print job, the stop possible period being a time period in which the execution of the print job can be stopped. The second notification processing portion notifies a user of an information processing apparatus that is a transmission source of a second print job, of the shortage of the consumable and presence of the first print job, the second print job being, among the print jobs stored in the storage portion, a print job that is to be executed later than the first print job in the execution order, and uses the consumable that will become insufficient during the stop possible period of the first print job.

An information processing apparatus according to another aspect of the present disclosure includes a transmission processing portion, a first notification processing portion, and a second notification processing portion. The transmission processing portion transmits a print job to an image forming apparatus so that the print job can be executed by the image forming apparatus. The first notification processing portion, when the print job transmitted by the transmission processing portion is a first print job, notifies a user of the information processing apparatus of a shortage of a consumable, the first print job being a print job for which the consumable that is necessary for execution of the print job will become insufficient during a stop possible period of the print job, the stop possible period being a time period in which the execution of the print job can be stopped. The second notification processing portion, when the print job transmitted by the transmission processing portion is a second print job, notifies the user of the information processing apparatus of the shortage of the consumable and presence of a print job that is to be executed earlier than the second print job in an execution order, the second print job being a print job that uses a consumable that will become insufficient before the stop possible period of the print job.

A notification method according to a further aspect of the present disclosure is implemented in an image forming system, and includes: storing print jobs transmitted from information processing apparatuses, into a storage portion; controlling an execution order of the print jobs stored in the storage portion for execution by an image forming apparatus; notifying a user of an information processing apparatus that is a transmission source of a first print job, of a shortage of a consumable, the first print job being, among the print jobs stored in the storage portion, a print job for which the consumable that is necessary for execution of the print job will become insufficient during a stop possible period of the print job, the stop possible period being a time period in which the execution of the print job can be stopped; and notifying a user of an information processing apparatus that is a transmission source of a second print job, of the shortage of the consumable and presence of the first print job, the second print job being, among the print jobs stored in the storage portion, a print job that is to be executed later than the first print job in the execution order, and uses the consumable that will become insufficient during the stop possible period of the first print job.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Image Forming System 100]

Figure 1:
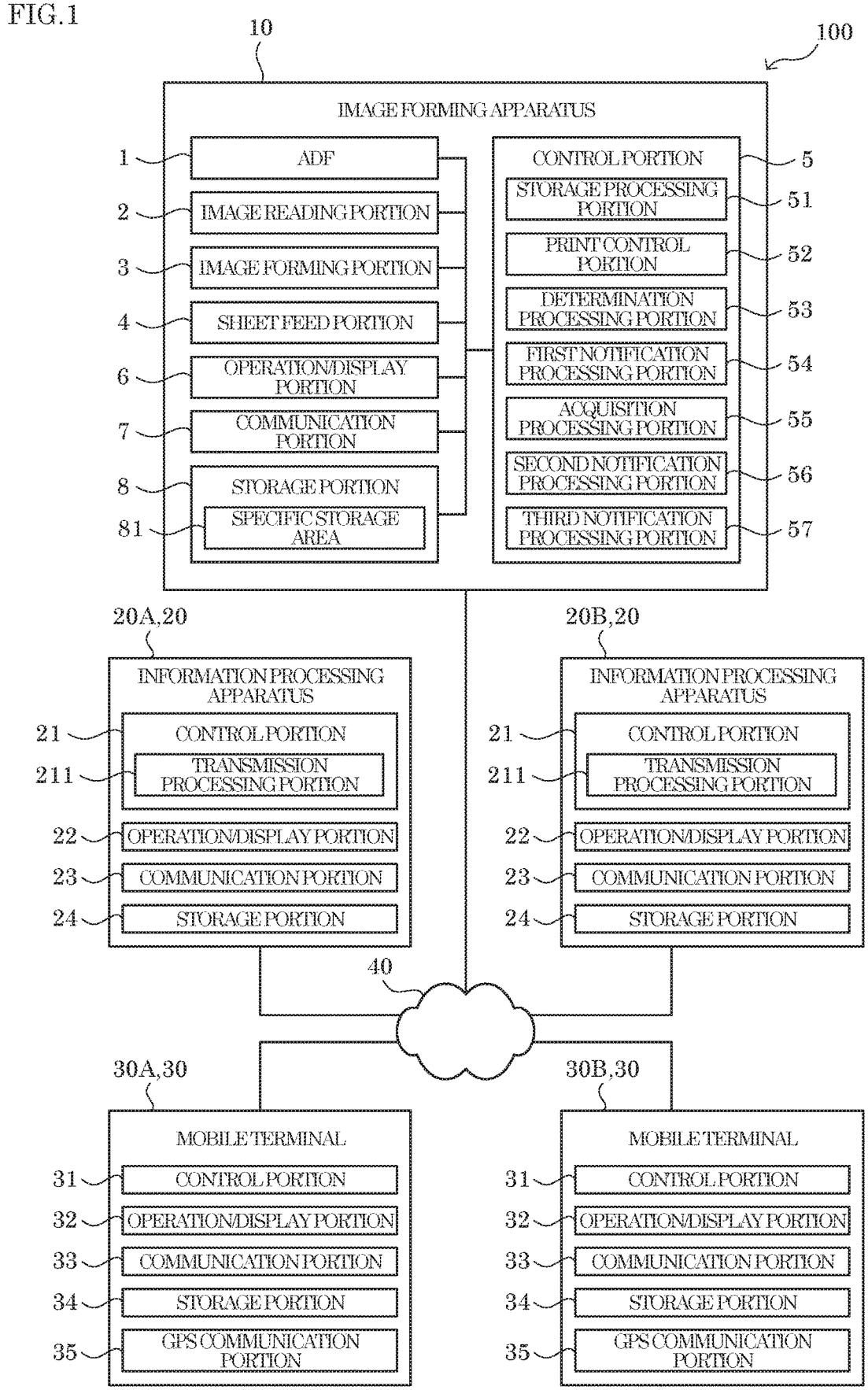
FIG. 1 is a block diagram showing a configuration of an image forming system including an image forming apparatus according to an embodiment of the present disclosure.

As shown in FIG. 1, an image forming system 100 including an image forming apparatus 10 according to the embodiment of the present disclosure includes the image forming apparatus 10, an information processing apparatus 20A, an information processing apparatus 20B, a mobile terminal 30A, and a mobile terminal 30B.

The information processing apparatus 20A and the information processing apparatus 20B have the same configuration elements. Hereinafter, the information processing apparatus 20A and the information processing apparatus 20B are collectively referred to as an information processing apparatus 20. In addition, the mobile terminal 30A and the mobile terminal 30B have the same configuration elements. Hereinafter, the mobile terminal 30A and the mobile terminal 30B are collectively referred to as a mobile terminal 30. It is noted that the image forming system 100 may include three or more information processing apparatuses 20 and as many mobile terminals 30. In addition, the image forming system 100 may not include the mobile terminal 30.

In the image forming system 100, the image forming apparatus 10 and the information processing apparatus 20 are communicably connected with each other via a communication network 40. In addition, in the image forming system 100, the image forming apparatus 10 and the mobile terminal 30 are communicably connected with each other via the communication network 40. For example, the communication network 40 is a wired or wireless LAN (Local Area Network).

[Image Forming Apparatus 101]

Next, the configuration of the image forming apparatus 10 is described with reference to FIG. 1 and FIG. 2. Here, FIG. 2 is a schematic cross-sectional diagram showing the configuration of the image forming apparatus 10.

The image forming apparatus 10 is configured to execute a print job using consumables. For example, the image forming apparatus 10 is a multifunction peripheral having a plurality of functions such as a scan function for reading image data from a document sheet, a print function for forming an image based on image data, a facsimile function, and a copy function. Here, the image forming apparatus 10 is an example of an image forming system of the present disclosure. It is noted that the image forming apparatus 10 may be a printer apparatus, a facsimile apparatus, a copier or the like.

Specifically, the consumables are sheets and developer (toner). It is noted that in a case where a post-processing device for performing post-processes such as stapling is attached to the image forming apparatus 10, the consumables may include consumables used in the post-processes, such as staples. In addition, in a case where the image forming apparatus 10 is configured to form an image by a thermal system, the consumables may be only thermal sheets.

Figure 2:
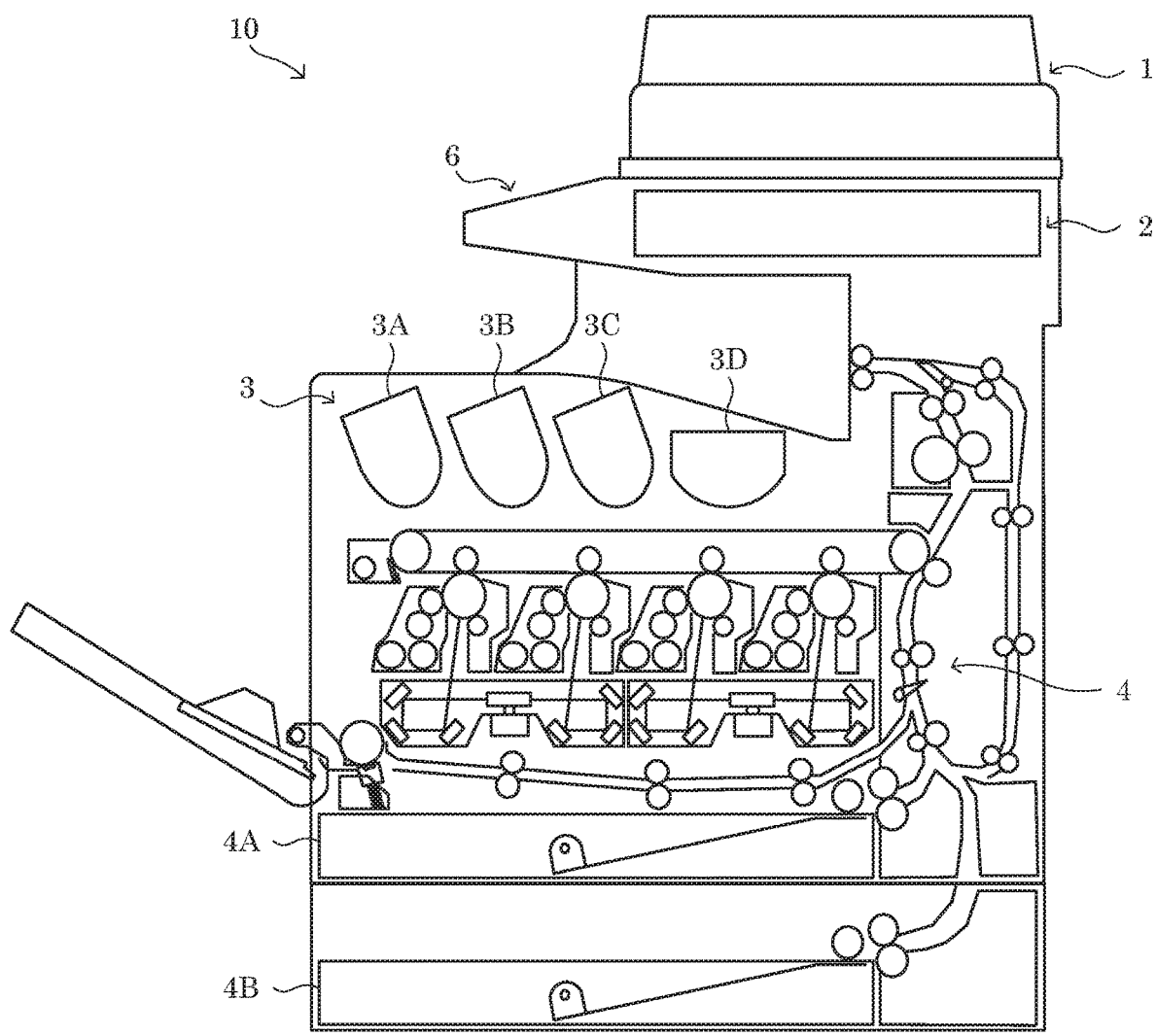
FIG. 2 is a diagram showing a configuration of the image forming apparatus according to the embodiment of the present disclosure.

As shown in FIG. 1 and FIG. 2, the image forming apparatus 10 includes an ADF (Auto Document Feeder) 1, an image reading portion 2, an image forming portion 3, a sheet feed portion 4, a control portion 5, an operation/display portion 6, a communication portion 7, and a storage portion 8.

The ADF 1 includes a document sheet setting portion, a plurality of conveyance rollers, a document sheet pressing, and a sheet discharge portion, and conveys a document sheet so that it is read by the image reading portion 2.

The image reading portion 2 includes a document sheet table, a light source, a plurality of mirrors, an optical lens, and a CCD, and is configured to read image data from a document sheet.

The image forming portion 3 is configured to form a color or monochrome image by an electrophotography method based on image data. As shown in FIG. 2, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, a sheet discharge tray, a toner container 3A, a toner container 3B, a toner container 3C, and a toner container 3D. The image forming portion 3 forms an image on a sheet supplied from the sheet feed portion 4 based on image data. The sheet with the image formed thereon by the image forming portion 3 is discharged onto the sheet discharge tray. It is noted that the image forming portion 3 may not be configured to form a color image. In addition, the image forming portion 3 may form an image by another image forming method such as an inkjet method.

The toner container 3A stores C (cyan) toner and supplies the toner to an image forming unit corresponding to C (cyan). The toner container 3B stores M (magenta) toner and supplies the toner to an image forming unit corresponding to M (magenta). The toner container 3C stores Y (yellow) toner and supplies the toner to an image forming unit corresponding to Y (yellow). The toner container 3D stores K (black) toner and supplies the toner to an image forming unit corresponding to K (black). The toner containers 3A, 3B, 3C, and 3D have the same configuration except for the color of the toner stored therein. The toner containers 3A, 3B, 3C, and 3D are attached to the housing of the image forming apparatus 10 in a detachable manner.

The sheet feed portion 4 supplies sheets one by one to the image forming portion 3. As shown in FIG. 2, the sheet feed portion 4 includes a sheet feed cassette 4A, a sheet feed cassette 4B, a sheet conveyance path, and a plurality of conveyance rollers. Sheets used in printing are stored in the sheet feed cassettes 4A and 4B. For example, A4 size sheets are stored in the sheet feed cassette 4A. In addition, B5 size sheets are stored in the sheet feed cassette 4B. The sheet feed cassettes 4A and 4B have the same configuration except for the sheets stored therein. The sheets supplied by the sheet feed portion 4 are, for example, sheet-like materials such as sheets of paper, sheets of coated paper, postcards, envelopes, or OHP sheets. It is noted that the sheet feed portion 4 may not include the sheet feed cassette 4B.

The control portion 5 includes control equipment such as a CPU, a ROM, and a RAM. The CPU is a processor that executes various calculation processes. The ROM is a nonvolatile storage device in which various information such as control programs for causing the CPU to execute various processes are preliminarily stored. The RAM is a volatile storage device that is used as a temporary storage memory (working area) for the various processes executed by the CPU. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information in response to control instructions from the control portion 5. The operation portion is composed of, for example, operation keys or a touch panel through which various types of information are input to the control portion 5 in response to user operations.

The communication portion 7 is a communication interface that is configured to execute a wired or wireless data communication with external communication apparatuses such as the information processing apparatus 20 and the mobile terminal 30 connected via the communication network 40.

The storage portion 8 is a nonvolatile storage device. The storage portion 8 is, for example, a nonvolatile memory such as a flash memory or an EEPROM, or a storage device such as an SSD (Solid State Drive) or an HDD (Hard Disk Drive).

[Information Processing Apparatus 20]

The information processing apparatus 20 is configured to transmit a print job to the image forming apparatus 10. For example, the information processing apparatus 20 is a personal computer in which a printer driver used to control the image forming apparatus 10 is installed. It is noted that the information processing apparatus 20 may be, for example, a smartphone, a tablet terminal, a mobile phone, a PDA, or a notebook computer.

As shown in FIG. 1, the information processing apparatus 20 includes a control portion 21, an operation/display portion 22, a communication portion 23, and a storage portion 24.

The control portion 21, as is the case with the control portion 5 of the image forming apparatus 10, includes control equipment such as a CPU, a ROM, and a RAM. In the control portion 21, the CPU executes various control programs that are preliminarily stored in the ROM. This allows the information processing apparatus 20 to be controlled comprehensively by the control portion 21.

The operation/display portion 22 includes a display portion and an operation portion. The display portion is, for example, a liquid crystal display and displays various types of information in response to control instructions from the control portion 21. The operation portion is composed of, for example, a keyboard and a mouse through which various types of information are input to the control portion 21 in response to user operations.

The communication portion 23 is a communication interface that is configured to execute a wired or wireless data communication with external communication apparatuses such as the image forming apparatus 10 connected via the communication network 40.

The storage portion 24 is a nonvolatile storage device as is the case with the storage portion 8 of the image forming apparatus 10. The printer driver corresponding to the image forming apparatus 10 is preliminarily stored in the storage portion 24. With the printer driver installed in the storage portion 24, the information processing apparatus 20 can perform a communication with the image forming apparatus 10, and control the image forming apparatus 10.

In addition, as shown in FIG. 1, the control portion 21 includes a transmission processing portion 211. Specifically, the control portion 21 executes the printer driver stored in the storage portion 24 by using the CPU. This allows the control portion 21 to function as the transmission processing portion 211.

The transmission processing portion 211 is configured to transmit a print job to the image forming apparatus 10. For example, in response to a user operation performed on the operation/display portion 22, the transmission processing portion 211 displays, on the operation/display portion 22, a setting screen that is used to set execution conditions of the print job, or input an instruction to execute the print job. Specifically, on the setting screen, it is possible to set a print color to either "color" or "monochrome". In addition, on the setting screen, it is possible to set a size of sheets used in printing to either "A4" or "B5". In addition, on the setting screen, it is possible to set the number of copies for the printing. When an operation is performed on the setting screen to input an instruction to execute a print job, the transmission processing portion 211 transmits the print job including print conditions set on the setting screen.

[Mobile Terminal 30]

The mobile terminal 30 is a portable smartphone or a tablet terminal. It is noted that the mobile terminal 30 may be, for example, a mobile phone, a PDA, or a notebook computer.

In the image forming system 100, the mobile terminal 30A corresponds to the information processing apparatus 20A, and the mobile terminal 30B corresponds to the information processing apparatus 20B. For example, in the image forming system 100, correspondence information is preliminarily stored in the storage portion 8 of the image forming apparatus 10, wherein the correspondence information includes identification information of the information processing apparatus 20, the name of the user of the information processing apparatus 20, and identification information of the mobile terminal 30 that corresponds to the information processing apparatus 20. With this configuration, in the image forming system 100, it is possible to cause the mobile terminal 30 corresponding to the information processing apparatus 20 to notify information concerning a print job transmitted by the information processing apparatus 20. It is noted that in the following description, the user of the information processing apparatus 20A is assumed to carry the mobile terminal 30A, and the user of the information processing apparatus 20B is assumed to carry the mobile terminal 30B.

As shown in FIG. 1, the mobile terminal 30 includes a control portion 31, an operation/display portion 32, a communication portion 33, a storage portion 34, and a GPS communication portion 35.

The control portion 31, as is the case with the control portion 5 of the image forming apparatus 10, includes control equipment such as a CPU, a ROM, and a RAM. In the control portion 31, the CPU executes the various control programs preliminarily stored in the ROM. This allows the mobile terminal 30 to be controlled comprehensively by the control portion 31.

The operation/display portion 32 includes a display portion and an operation portion. The display portion is, for example, a liquid crystal display and displays various types of information in response to control instructions from the control portion 31. The operation portion is composed of, for example, operation keys or a touch panel through which various types of information are input to the control portion 31 in response to user operations.

The communication portion 33 is a communication interface that is configured to execute a wireless data communication with external communication apparatuses such as the image forming apparatus 10 connected via the communication network 40.

The storage portion 34 is a nonvolatile storage device as is the case with the storage portion 8 of the image forming apparatus 10. An application program corresponding to the image forming apparatus 10 is preliminarily stored in the storage portion 34. With the application program installed in the storage portion 34, the mobile terminal 30 can perform a communication with the image forming apparatus 10, and notify information concerning a print job transmitted by the information processing apparatus 20 corresponding to the mobile terminal 30.

The GPS communication portion 35 is configured to receive a radio wave transmitted from a GPS satellite. The mobile terminal 30 is configured to acquire terminal position information indicating a current position of the mobile terminal 30 itself, based on information contained in the radio wave received by the GPS communication portion 35.

Meanwhile, in the image forming apparatus 10, during an execution of a print job, a subsequent print job may be input. There is known, as a related technology, an image forming apparatus that determines, when a subsequent print job is input, whether or not any of the consumables will become insufficient by executing the subsequent print job, and upon determining that any of the consumables will become insufficient, notifies the fact.

Here, in the image forming apparatus according to the related technology, in a case where there are a plurality of subsequent print jobs, a plurality of users may be notified that a consumable will become insufficient. In that case, the consumable may be replenished redundantly by the plurality of users who have been notified of the fact. On the other hand, the image forming apparatus 10 according to the embodiment of the present disclosure can restrict a redundant replenishment of a consumable by a plurality of users, as described below.

Specifically, the storage portion 8 of the image forming apparatus 10 preliminarily stores a notification program that causes the CPU of the control portion 5 to execute a notification process (see the flowchart of FIG. 3) and a print control process (see the flowchart of FIG. 5) that are described below. It is noted that the notification program may be recorded on a non-transitory computer-readable recording medium such as a CD, a DVD, or a flash memory, and may be read from the recording medium and installed in the storage portion 8.

As shown in FIG. 1, the control portion 5 of the image forming apparatus 10 includes a storage processing portion 51, a print control portion 52, a determination processing portion 53, a first notification processing portion 54, an acquisition processing portion 55, a second notification processing portion 56, and a third notification processing portion 57. Specifically, the control portion 5 executes the notification program stored in the storage portion 8 by using the CPU. This allows the control portion 5 to function as the storage processing portion 51, the print control portion 52, the determination processing portion 53, the first notification processing portion 54, the acquisition processing portion 55, the second notification processing portion 56, and the third notification processing portion 57.

The storage processing portion 51 stores print jobs transmitted from the information processing apparatuses 20, into a specific storage area 81 (see FIG. 1) of the storage portion 8.

Here, the specific storage area 81 is preliminarily set in the storage portion 8 as a storage area for storing print jobs. It is noted that the specific storage area 81 may be a part of a plurality of storage devices included in the storage portion 8. Here, the specific storage area 81 is an example of a storage portion of the present disclosure.

The print control portion 52 controls an execution order of the print jobs stored in the specific storage area 81.

For example, the print control portion 52 controls the execution order of a plurality of print jobs stored in the specific storage area 81 such that the print jobs are executed in the order of storage into the specific storage area 81.

Specifically, when one or more print jobs are stored in the specific storage area 81, the print control portion 52 determines an execution-target print job based on a storage timing of each of the one or more print jobs in the specific storage area 81. Subsequently, the print control portion 52 inputs the determined execution-target print job to the image forming portion 3. Upon receiving the print job from the print control portion 52, the image forming portion 3 executes the print job. Thereafter, when the execution of the print job by the image forming portion 3 is completed, the print control portion 52 deletes the print job from the specific storage area 81, and determines the next execution-target print job.

The determination processing portion 53 determines, for each of the print jobs stored in the specific storage area 81, whether or not the print job is a first print job or a second print job.

Here, the first print job is a print job for which a consumable that is necessary for the execution of the print job, will become insufficient during a stop possible period of the print job. In addition, the second print job is a print job that is to be executed later than the first print job in the execution order, and uses the consumable that will become insufficient during the stop possible period of the first print job.

It is noted that the stop possible period is a time period in which the execution of the print job can be stopped due to a shortage of a consumable. Specifically, the stop possible period is a time period extending from an execution start to immediately before an end of a stop-target print job, or a time period extending from an end of a print job immediately before a stop-target print job to immediately before an end of the stop-target print job. In addition, the "shortage of a consumable" refers to a state where a remaining amount of the consumable is equal to or lower than a predetermined lower limit value, the lower limit value being preliminarily set for each of the consumables. For example, the lower limit value of the sheets is 0 (zero). In addition, the lower limit value of the toner is a predetermined value that is higher than 0 (zero).

Specifically, the determination processing portion 53 determines whether or not a print job is the first print job or the second print job, at a timing when the storage processing portion 51 stores the print job in the specific storage area 81.

For example, first, the determination processing portion 53 determines whether or not a determination-target print job is a second print job. Specifically, when a first print job that is to be executed earlier than the determination-target print job in the execution order is stored in the specific storage area 81, and the determination-target print job uses a consumable that will become insufficient during the stop possible period of the first print job, the determination processing portion 53 determines that the determination-target print job is a second print job.

Next, the determination processing portion 53 determines whether or not the determination-target print job is a first print job. Specifically, when a current remaining amount of a consumable used by the determination-target print job is lower than a total amount of the consumable that is to be consumed by the determination-target print job and a print job(s) that is to be executed earlier than the determination-target print job in the execution order, the determination processing portion 53 determines that the determination-target print job is a first print job.

It is noted that the determination processing portion 53 can identify consumables used by a print job based on execution conditions of the print job. For example, when "color" is specified as the print color and "A4" is specified as the sheet size in the execution conditions of the print job, the determination processing portion 53 determines that the consumables used by the print job are toner of colors C (cyan), M (magenta), and Y (yellow) and sheets of A4 size.

In addition, for example, the determination processing portion 53 can detect the remaining amount of toner of C (cyan) in the toner container 3A, based on a difference between the current weight of the toner container 3A detected by a weight sensor (not shown) and a predetermined initial weight. The determination processing portion 53 can also detect the remaining amount of toner in the toner containers 3B, 3C, and 3D by a similar method.

In addition, for example, the determination processing portion 53 can detect the remaining amount of sheets (the remaining number of sheets) stored in the sheet feed cassette 4A, based on a weight of a bundle of sheets in the sheet feed cassette 4A detected by a weight sensor (not shown) and a predetermined unit weight of a sheet of A4 size. The determination processing portion 53 can also detect the remaining amount of sheets (the remaining number of sheets) stored in the sheet feed cassette 4B by a similar method.

In addition, the determination processing portion 53 can calculate the amount of the consumable consumed in the print job, based on the image data printed in the print job and the execution conditions of the print job.

For example, upon determining that the determination-target print job is a first print job, the determination processing portion 53 stores predetermined first specific information in the RAM of the control portion 5. Here, the first specific information includes identification information of the print job that was determined as a first print job, identification information of the information processing apparatus 20 that is the transmission source of the print job, and information indicating a consumable that will become insufficient.

In addition, upon determining that the determination-target print job is a second print job, the determination processing portion 53 stores predetermined second specific information in the RAM of the control portion 5. Here, the second specific information includes identification information of the print job that was determined as a second print job, identification information of the information processing apparatus 20 that is the transmission source of the print job, and information indicating a consumable that will become insufficient.

Here, when the execution timing of the first print job has come, the print control portion 52 suspends the execution of the first print job. In addition, when the execution timing of the first print job has come, if there is a third print job that is to be executed later than the first print job in the execution order and does not use the consumable that will become insufficient during the stop possible period of the first print job, the print control portion 52 executes the third print job. It is noted that when there are a plurality of third print jobs, the print control portion 52 executes the plurality of third print jobs in sequence according to the execution order.

The first notification processing portion 54 is configured to notify the user of an information processing apparatus 20 that is the transmission source of the first print job, of a shortage of a consumable.

Specifically, the first notification processing portion 54 notifies the user of the information processing apparatus 20 that is the transmission source of the first print job, of the shortage of the consumable, at a timing when the first print job is stored in the specific storage area 81 by the storage processing portion 51.

For example, the first notification processing portion 54 displays a predetermined first notification screen on the operation/display portion 22 of the information processing apparatus 20 that is the transmission source of the first print job. For example, the first notification screen includes a message that a consumable used by the first print job will become insufficient during the stop possible period of the first print job, information indicating the consumable that will become insufficient, and the shortage amount of the consumable.

It is noted that the first notification processing portion 54 may display the first notification screen on the operation/display portion 32 of the mobile terminal 30 that corresponds to the information processing apparatus 20 that is the transmission source of the first print job. In addition, the first notification processing portion 54 may transmit an e-mail that includes information displayed on the first notification screen, to an e-mail address corresponding to the information processing apparatus 20 that is the transmission source of the first print job.

The acquisition processing portion 55 is configured to acquire position information that indicates the current position of the user of the information processing apparatus 20 that is the transmission source of the first print job.

Specifically, the acquisition processing portion 55 acquires the position information, at a timing when the second print job is stored in the specific storage area 81 by the storage processing portion 51.

In addition, the acquisition processing portion 55 acquires the position information at a predetermined interval. For example, the interval is an arbitrary time period in a range from one second to 10 seconds. It is noted that the interval may be arbitrarily set in response to a user operation performed on the operation/display portion 6.

For example, in the image forming apparatus 10, the terminal position information of the mobile terminal 30 corresponding to the information processing apparatus 20 that is the transmission source of the first print job, is regarded as the position information. That is, in the image forming apparatus 10, the current position of the mobile terminal 30 carried by the user of the information processing apparatus 20 that is the transmission source of the first print job, is regarded as the current position of the user. The acquisition processing portion 55 acquires the terminal position information of the mobile terminal 30 from the mobile terminal 30 corresponding to the information processing apparatus 20 that is the transmission source of the first print job.

It is noted that the acquisition processing portion 55 may be configured to acquire the position information by, for example, a method of identifying the current position of the user based on a result of matching image data acquired by a plurality of surveillance cameras with a facial image of the user that is preliminarily stored in the storage portion 8. In addition, the acquisition processing portion 55 may acquire the position information once or a predetermined number of times at the predetermined interval. In addition, the control portion 5 may not include the acquisition processing portion 55.

The second notification processing portion 56 is configured to notify the user(s) of the information processing apparatus(es) 20 that is the transmission source(s) of the second print job(s), of a shortage of a consumable, presence of the first print job, and the position information acquired by the acquisition processing portion 55.

Specifically, the second notification processing portion 56 notifies the user(s) of the information processing apparatus(es) 20 that is the transmission source(s) of the second print job(s), of the shortage of the consumable and the like at the timing when the second print job(s) is stored in the specific storage area 81 by the storage processing portion 51.

In addition, each time the acquisition processing portion 55 acquires position information, the second notification processing portion 56 notifies the position information.

For example, the second notification processing portion 56 displays a predetermined second notification screen X10 (see FIG. 6) on the operation/display portion 22 of the information processing apparatus(es) 20 that is the transmission source(s) of the second print job(s).

Figure 6:
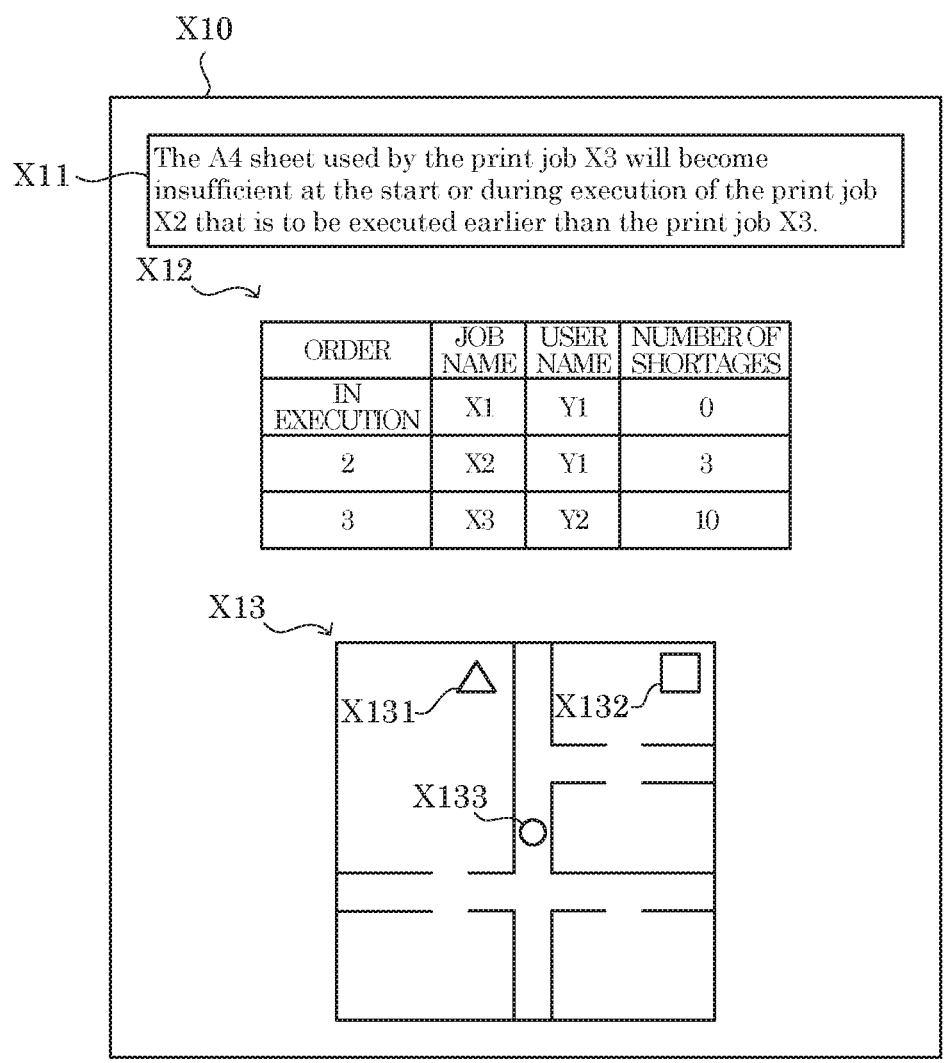
FIG. 6 is a diagram showing an example of a second notification screen displayed on an information processing apparatus included in the image forming system.

Here, FIG. 6 shows an example of the second notification screen X10. As shown in FIG. 6, the second notification screen X10 includes a message display field X11, a print job display field X12, and a map image X13.

A message to the user(s) of the information processing apparatus(es) 20 is displayed in the message display field X11. Specifically, a message that a consumable used by the second print job will become insufficient during the stop possible period of the first print job, is displayed in the message display field X11, the message including information indicating the consumable that will become insufficient. It is noted that in the message displayed in the message display field X11 of the second notification screen X10 shown in FIG. 6, the "print job X3" is the second print job, and the "print job X2" is the first print job.

In the print job display field X12, a second print job and print jobs that that are to be executed earlier than the second print job in the execution order are displayed in a list format. Specifically, in the print job display field X12, are displayed the execution order of the print jobs, job names, names of users of information processing apparatuses 20 that are the transmission sources, and the number of shortages of consumables. It is noted that in the print job display field X12, information concerning the second print job may be displayed so as to be distinguished from the other print jobs.

The map image X13 is an image representing a map of a predetermined range including the installation position of the image forming apparatus 10 and the storage location of the consumable. The map image X13 includes images X131 and X132, the image X131 representing the installation position of the image forming apparatus 10, the image X132 representing the storage location of the consumable. The map image X13 also includes an image X133 that represents the current position of the user of the information processing apparatus 20 that is the transmission source of the first print job. The image X133 is displayed based on the position information acquired by the acquisition processing portion 55. In addition, the display position of the image X133 in the map image X13 is updated each time the acquisition processing portion 55 acquires the position information.

It is noted that in a case where the control portion 5 does not include the acquisition processing portion 55, the second notification processing portion 56 may notify the user(s) of the information processing apparatus(es) 20 that is the transmission source(s) of the second print job(s), of the shortage of the consumable and the presence of the first print job. In this case, the second notification screen X10 may not include the map image X13. In addition, the second notification processing portion 56 may display the second notification screen X10 on the operation/display portion 32 of the mobile terminal(s) 30 that corresponds to the user(s) of the information processing apparatus(es) 20 that is the transmission source(s) of the second print job(s). In addition, the second notification processing portion 56 may send an e-mail that includes information displayed on the second notification screen X10, to an e-mail address(es) that has preliminarily been associated with the user(s) of the information processing apparatus(es) 20 that is the transmission source(s) of the second print job(s).

Here, each time the second notification processing portion 56 notifies a user of an information processing apparatus 20 that is the transmission source of a second print job, of the shortage of the consumable and the presence of the first print job, the first notification processing portion 54 notifies an amount of the consumable that is to be consumed by the second print job.

For example, the first notification processing portion 54 displays a predetermined third notification screen on the operation/display portion 32 of the mobile terminal 30 that corresponds to the information processing apparatus 20 that is the transmission source of the first print job. For example, the third notification screen includes a message and the same information as the one displayed on the print job display field X12 of the second notification screen X10, the message indicating that a print job that uses the consumable that will become insufficient during the stop possible period of the first print job, has been newly input.

It is noted that the first notification processing portion 54 may send an e-mail that includes information displayed on the third notification screen, to an e-mail address that has preliminarily been associated with the user of the information processing apparatus 20 that is the transmission source of the first print job. In addition, the first notification processing portion 54 may not notify the amount of the consumable that is to be consumed in the second print job.

When, after the second notification processing portion 56 notified the user(s) of the information processing apparatus(es) 20 that is the transmission source(s) of the second print job(s), of the shortage of the consumable and the presence of the first print job, the consumable has been replenished, the third notification processing portion 57 notifies the user(s) that the consumable has been replenished.

For example, the third notification processing portion 57 displays, on the second notification screen X10, a pop-up image including a message indicating that the consumable that will become insufficient during the stop possible period of the first print job, has been replenished.

It is noted that the third notification processing portion 57, when it is detected that an external cover of the image forming apparatus 10 was closed, determines whether or not the toner has been replenished, based on the remaining amounts of toner in the toner containers 3A, 3B, 3C, and 3D. In addition, the second notification processing portion 56, when an attachment of the sheet feed cassette 4A or 4B is detected, determines whether or not sheets have been replenished, based on the remaining amount of sheets in the sheet feed cassette 4A or 4B.

It is noted that the control portion 5 may not include the third notification processing portion 57.

[Notification Process]

Figure 3:
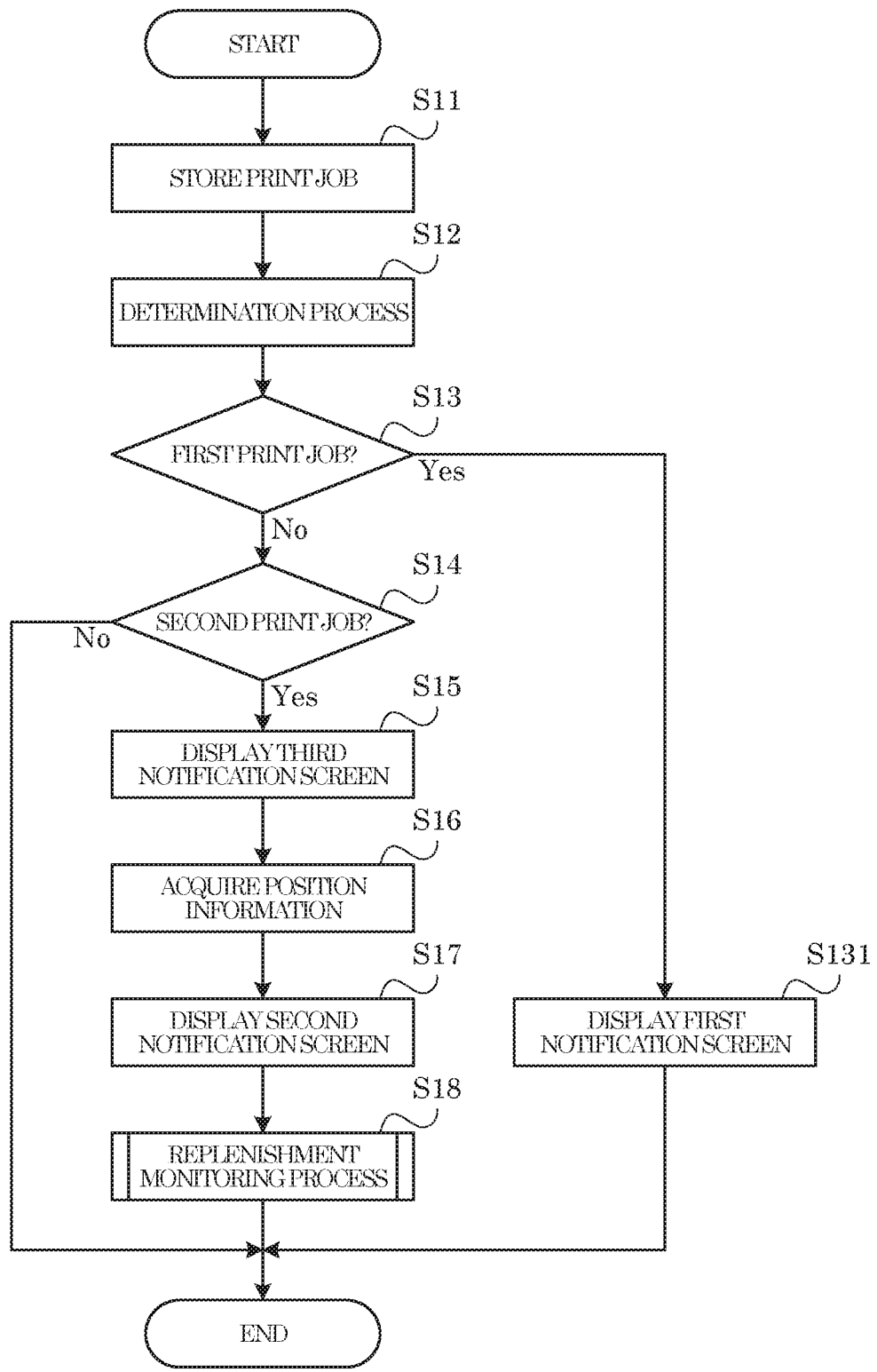
FIG. 3 is a flowchart showing an example of a notification process executed by the image forming apparatus according to the embodiment of the present disclosure.

In the following, with reference to FIG. 3, a description is given of an example of the procedure of the notification process executed by the control portion 5 in the image forming apparatus 10, and a part of the notification method of the present disclosure. Here, steps S11, S12, . . . represent numbers assigned to the processing procedures (steps) executed by the control portion 5. It is noted that when a print job is received from an information processing apparatus 20, the notification process is executed as a process corresponding to the print job.

<Step S11>

First, in step S11, the control portion 5 stores the received print job in the specific storage area 81. Here, the process of step S11 is executed by the storage processing portion 51 of the control portion 5.

<Step S12>

In step S12, the control portion 5 executes a determination process of determining whether or not the print job stored in the specific storage area 81 in step S11 is the first print job or the second print job. Here, the process of step S12 is executed by the determination processing portion 53 of the control portion 5.

For example, the control portion 5 determines whether or not the determination-target print job is the second print job based on the first specific information stored in the RAM of the control portion 5. Here, upon determining that the determination-target print job is the second print job, the control portion 5 stores the second specific information in the RAM of the control portion 5. On the other hand, upon determining that the determination-target print job is not the second print job, the control portion 5 determines whether or not the determination-target print job is the first print job. Here, upon determining that the determination-target print job is the first print job, the control portion 5 stores the first specific information in the RAM of the control portion 5.

<Step S13>

In step S13, the control portion 5 determines whether or not it has been determined, in the determination process executed in step S12, that the print job is the first print job.

Here, upon determining that it has been determined, in the determination process executed in step S12, that the print job is the first print job (Yes side at S13), the control portion 5 moves the process to step S131. In addition, upon determining that it has not been determined in the determination process executed in step S12 that the print job is the first print job (No side at S13), the control portion 5 moves the process to step S14.

<Step S131>

In step S131, the control portion 5 displays the first notification screen on the operation/display portion 22 of the information processing apparatus 20 that is the transmission source of the print job (the first print job) that was stored in the specific storage area 81 in step S11. Here, the process of step S131 is executed by the first notification processing portion 54 of the control portion 5.

Here, in the notification process, the shortage of the consumable is notified to the user of the information processing apparatus 20 that is the transmission source of the first print job, at a timing when the first print job is stored in the specific storage area 81. This makes it possible for the user of the information processing apparatus 20 that is the transmission source of the first print job, to start replenishing the consumable before execution of the first print job is started or interrupted.

It is noted that the first notification screen may be configured to receive an input of an instruction to cancel the execution of the first print job. In this case, when an instruction to cancel the execution of the first print job is input to the first notification screen, the control portion 5 may delete the first print job from the specific storage area 81.

In addition, the first notification screen may be configured to receive an input of an instruction to change the execution condition of the first print job. In this case, when an instruction to change the execution condition of the first print job is input to the first notification screen, the control portion 5 may change the execution condition of the first print job, and execute step S12 and onward on the print job again.

<Step S14>

In step S14, the control portion 5 determines whether or not it has been determined, in the determination process executed in step S12, that the print job is the second print job.

Here, upon determining that it has been determined, in the determination process executed in step S12, that the print job is the second print job (Yes side at S14), the control portion 5 moves the process to step S15. In addition, upon determining that it has not been determined, in the determination process executed in step S12, that the print job is the second print job (No side at S14), the control portion 5 ends the notification process.

<Step S15>

In step S15, the control portion 5 displays the third notification screen on the operation/display portion 32 of the mobile terminal 30 that corresponds to the information processing apparatus 20 that is the transmission source of the first print job stored in the specific storage area 81. Here, the process of step S15 is executed by the first notification processing portion 54 of the control portion 5.

With this configuration, the user of the information processing apparatus 20 that is the transmission source of the first print job can determine a replenishment amount of the consumable so that the consumable does not become insufficient during the stop possible period of the subsequent print job.

<Step S16>

In step S16, the control portion 5 acquires the position information that indicates the current position of the user of the information processing apparatus 20 that is the transmission source of the first print job stored in the specific storage area 81. Here, the process of step S16 is executed by the acquisition processing portion 55 of the control portion 5.

For example, the control portion 5 acquires the terminal position information of the mobile terminal 30 that is regarded as the position information, from the mobile terminal 30 corresponding to the information processing apparatus 20 that is the transmission source of the first print job.

<Step S17>

In step S17, the control portion 5 displays the second notification screen X10 on the operation/display portion 22 of the information processing apparatus 20 that is the transmission source of the print job (the second print job) that was stored in the specific storage area 81 in step S11. Here, the process of step S17 is executed by the second notification processing portion 56 of the control portion 5.

This makes it possible for the user of the information processing apparatus 20 that is the transmission source of the second print job, to recognize the possibility that there is another user who has started replenishing the consumable prior to the user him/herself, and refrain from replenishing the consumable.

Here, the second notification screen X10 includes the map image X13 that includes the installation position of the image forming apparatus 10, the storage location of the consumable, and a position indicated by the position information acquired in step S16. This allows the user of the information processing apparatus 20 that is the transmission source of the second print job, to know about the progress of the replenishment of the consumable by the user of the information processing apparatus 20 that is the transmission source of the first print job.

<Step S18>

In step S18, the control portion 5 executes a replenishment monitoring process that is described in the following.

It is noted that in the notification process, the process of step S11 may be executed at any timing after step S12 and before step S18. In addition, in the notification process, the process of step S15 may be omitted. In addition, in the notification process, the process of step S16 may be omitted. In this case, the second notification screen X10 displayed in step S17 may not include the map image X13.

[Replenishment Monitoring Process]

Figure 4:
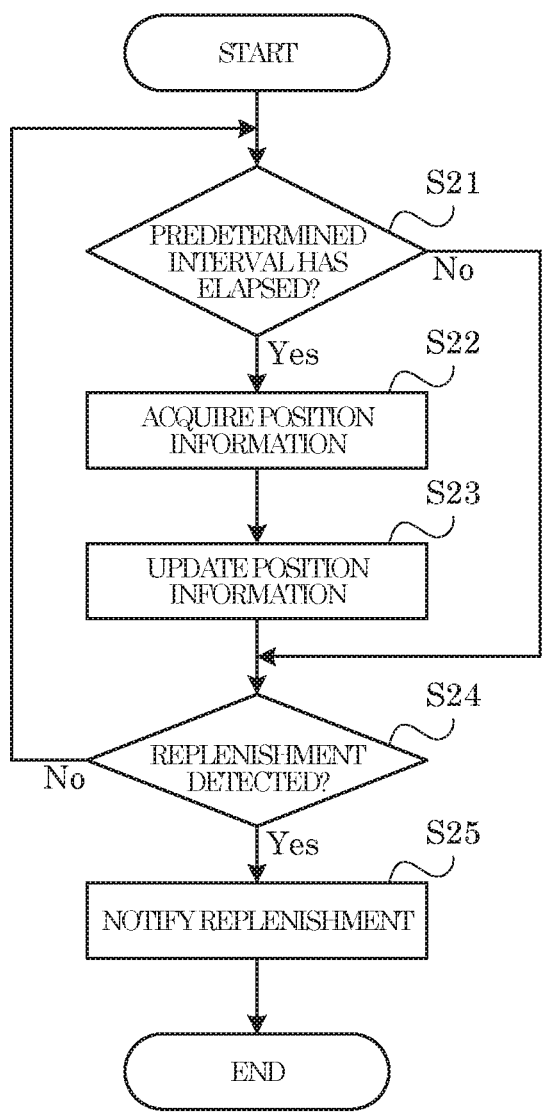
FIG. 4 is a flowchart showing an example of a replenishment monitoring process executed by the image forming apparatus according to the embodiment of the present disclosure.

In the following, with reference to FIG. 4, a description is given of the replenishment monitoring process executed in step S18 of the notification process.

<Step S21>

First, in step S21, the control portion 5 determines whether or not the predetermined interval has elapsed from the start of the replenishment monitoring process, or from the execution of the process of step S22.

Here, upon determining that the predetermined interval has elapsed (Yes side at S21), the control portion 5 moves the process to step S22. In addition, upon determining that the predetermined interval has not elapsed (No side at S21), the control portion 5 moves the process to step S24.

<Step S22>

In step S22, the control portion 5, as in step S16 of the notification process, acquires the position information. Here, the processes of steps S21 and S22 are executed by the acquisition processing portion 55 of the control portion 5.

<Step S23>

In step S23, the control portion 5 updates the display position of the image X133 in the second notification screen X10, based on the position information acquired in step S22. Here, the process of step S23 is executed by the second notification processing portion 56 of the control portion 5.

This allows the user of the information processing apparatus 20 that is the transmission source of the second print job, to know, in real time, about the progress of the replenishment of the consumable by the user of the information processing apparatus 20 that is the transmission source of the first print job.

<Step S24>

In step S24, the control portion 5 determines whether or not a replenishment of the consumable that will become insufficient during the stop possible period of the first print job, has been detected.

Here, upon determining that the replenishment of the consumable has been detected (Yes side at S24), the control portion 5 moves the process to step S25. In addition, upon determining that the replenishment of the consumable has not been detected (No side at S24), the control portion 5 moves the process to step S21.

<Step S25>

In step S25, the control portion 5 notifies the user of the information processing apparatus 20 that is the transmission source of the second print job, that the consumable has been replenished. Here, the processes of steps S24 and S25 are executed by the third notification processing portion 57 of the control portion 5.

For example, the control portion 5 displays, on the second notification screen X10, a pop-up image including a message indicating that the consumable that will become insufficient during the stop possible period of the first print job, has been replenished. This allows the user of the information processing apparatus 20 that is the transmission source of the second print job, to recognize that the user him/herself does not need to replenish the consumable.

In addition, the control portion 5 deletes, from the RAM of the control portion 5, the first specific information and the second specific information that indicate the consumable that has been replenished.

It is noted that when it is found, after it is detected that the consumable has been replenished, that a consumable to be used by the second print job will become insufficient before or during the stop possible period of the second print job, the control portion 5 may notify the user of the information processing apparatus 20 that is the transmission source of the second print job, of the fact. In that case, the control portion 5 may keep the second specific information corresponding to the second print job, in the RAM.

In addition, in the replenishment monitoring process, the processes of steps S21 to S23 may be omitted.

[Print Control Process]

Figure 5:
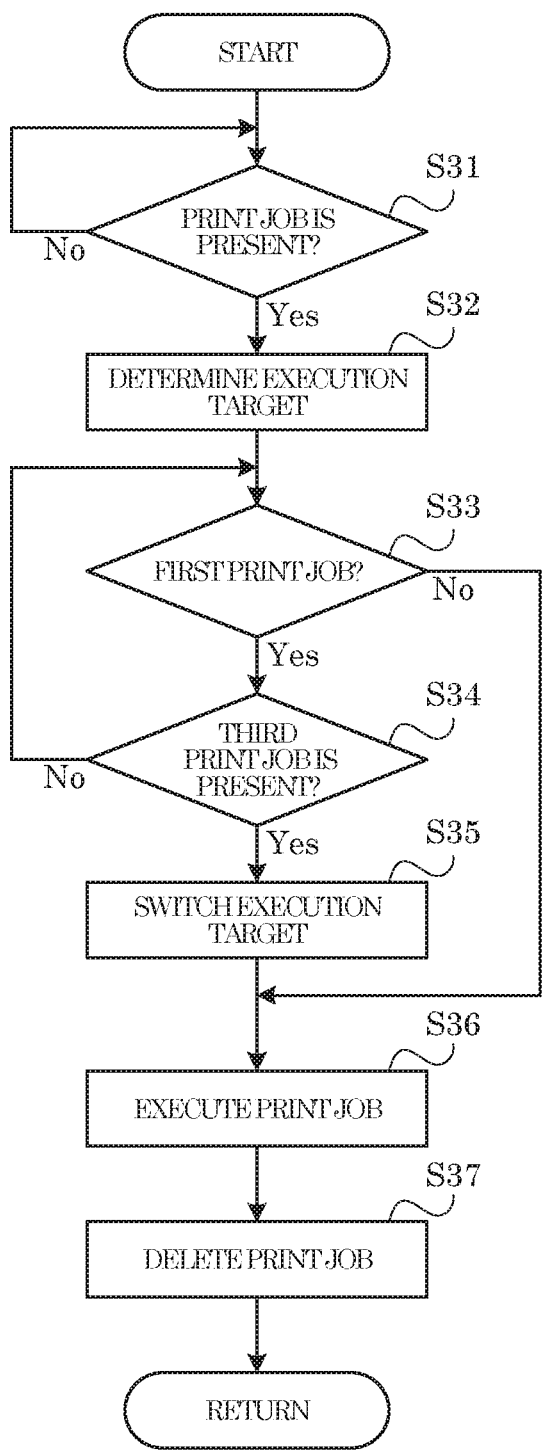
FIG. 5 is a flowchart showing an example of a print control process executed by the image forming apparatus according to the embodiment of the present disclosure.

In the following, with reference to FIG. 5, a description is given of an example of the procedure of the print control process executed by the control portion 5 in the image forming apparatus 10, and a part of the notification method of the present disclosure. Here, the print control process is executed by the print control portion 52 of the control portion 5.

<Step S31>

First, in step S31, the control portion 5 determines whether or not a print job is stored in the specific storage area 81.

Here, upon determining that a print job is stored in the specific storage area 81 (Yes side at S31), the control portion 5 moves the process to step S32. In addition, upon determining that no print job is stored in the specific storage area 81 (No side at S31), the control portion 5 waits at step S31 until a print job is stored in the specific storage area 81.

<Step S32>

In step S32, the control portion 5 determines an execution-target print job among one or more print jobs stored in the specific storage area 81.

Specifically, the control portion 5 determines, as the execution-target print job, a print job that was stored in the specific storage area 81 at an earliest timing among the one or more print jobs stored in the specific storage area 81.

<Step S33>

In step S33, the control portion 5 determines whether or not the print job determined as the execution-target print job in step S32 is the first print job.

Specifically, when the first specific information corresponding to the print job determined as the execution-target print job, is stored in the RAM of the control portion 5, the control portion 5 determines that the print job is the first print job.

Here, upon determining that the print job determined as the execution-target print job is the first print job (Yes side at S33), the control portion 5 moves the process to step S34. In addition, upon determining that the print job determined as the execution-target print job is not the first print job (No side at S33), the control portion 5 moves the process to step S36.

<Step S34>

In step S34, the control portion 5 determines whether or not the third print job is stored in the specific storage area 81.

For example, the control portion 5 determines whether or not the third print job is stored in the specific storage area 81, based on the second specific information stored in the RAM of the control portion 5.

Here, upon determining that the third print job is stored in the specific storage area 81 (Yes side at S34), the control portion 5 moves the process to step S35. In addition, upon determining that the third print job is not stored in the specific storage area 81 (No side at S34), the control portion 5 moves the process to step S33. In this case, the control portion 5 repeatedly executes the processes of steps S33 and S34 until it is determined that the print job determined as the execution-target print job is not the first print job, or until the third print job is stored in the specific storage area 81. It is noted that when the first specific information has been deleted from the RAM of the control portion 5 due to detection of replenishment of the consumable (step S25 of the replenishment monitoring process), the control portion 5 determines that the print job determined as the execution-target print job is not the first print job.

<Step S35>

In step S35, the control portion 5 switches the execution-target print job from the print job (the first print job) determined in step S32 as the execution-target print job to the third print job. This allows the execution of the first print job to be suspended, thereby avoiding delay of execution of a subsequent print job that does not use the consumable that will become insufficient.

<Step S36>

In step S36, the control portion 5 executes the execution-target print job.

<Step S37>

In step S37, the control portion 5 deletes the print job executed in step S36 from the specific storage area 81.

It is noted that in the print control process, the processes of steps S34 and S35 may be omitted. In this case, the control portion 5 may suspend the execution of the first print job, or may execute the first print job until the execution is stopped due to the shortage of the consumable.

As described above, in the image forming apparatus 10, a user(s) of the information processing apparatus(es) 20 that is the transmission source(s) of the second print job(s) is notified of a shortage of a consumable and presence of the first print job. This allows the user(s) of the information processing apparatus(es) 20 that is the transmission source(s) of the second print job(s) to recognize a possibility that there is another user who has started replenishing the consumable prior to the user(s) him/herself, and refrain from replenishing the consumable. As a result, the image forming apparatus 10 can prevent the consumable from being replenished redundantly by a plurality of users.

Other Embodiments

The print control portion 52 may control the execution order of print jobs stored in the specific storage area 81 based on the priority set to each of the print jobs. For example, it may be configured that a priority "high" or "low" is set to each of the print jobs on the setting screen of the information processing apparatus 20. In this case, for example, the print control portion 52 controls the execution order of the print jobs such that print jobs with priority "high" are first executed in the order of arrival, and then print jobs with priority "low" are executed in the order of arrival. In addition, the control portion 5, upon receiving a print job from the information processing apparatus 20, executes the notification process on the print job, and executes the notification process without the process of step S11 on print jobs that are to be executed later than the print job in the execution order.

In addition, the determination processing portion 53 may determine, at a timing immediately before the print control portion 52 inputs the print job to the image forming portion 3, whether or not the print job is the first print job, and determine whether or not each of print jobs stored in the specific storage area 81 is the second print job.

In this case, the first notification processing portion 54 may notify, at the timing immediately before the print control portion 52 inputs the print job to the image forming portion 3, the user of the information processing apparatus 20 that is the transmission source of the first print job, of a shortage of a consumable. In addition, the acquisition processing portion 55 may acquire the position information at the timing immediately before the print control portion 52 inputs the print job to the image forming portion 3. In addition, the second notification processing portion 56 may notify, at the timing immediately before the print control portion 52 inputs the print job to the image forming portion 3, the user(s) of the information processing apparatus(es) 20 that is the transmission source(s) of the second print job(s), of the shortage of the consumable or the like.

In addition, when, during an execution of a print job, the execution of the print job is stopped (interrupted) due to a shortage of a consumable, the determination processing portion 53 may determine that the print job is the first print job, and determine whether or not each of print jobs stored in the specific storage area 81 is the second print job.

In this case, at a timing when the execution of the print job is interrupted due to the shortage of the consumable, the first notification processing portion 54 may notify the user of the information processing apparatus 20 that is the transmission source of the first print job, of the shortage of the consumable. In addition, at the timing when the execution of the print job is interrupted due to the shortage of the consumable, the acquisition processing portion 55 may acquire the position information. In addition, at the timing when the execution of the print job is interrupted due to the shortage of the consumable, the second notification processing portion 56 may notify the user(s) of the information processing apparatus(es) 20 that is the transmission source(s) of the second print job(s), of the shortage of the consumable and the like.

In the image forming system 100, the determination processing portion 53, the first notification processing portion 54, the acquisition processing portion 55, the second notification processing portion 56, and the third notification processing portion 57 may be included in the control portion 21 of the information processing apparatus 20, not in the control portion 5 of the image forming apparatus 10. In this case, when a print job transmitted by the transmission processing portion 211 is the first print job, the first notification processing portion 54 may notify the user of the information processing apparatus 20 of a shortage of a consumable. In addition, when a print job transmitted by the transmission processing portion 211 is the second print job, the second notification processing portion 56 may notify the user of the information processing apparatus 20 of a shortage of a consumable and presence of the first print job. Here, the image forming system 100 including: the image forming apparatus 10 that includes the storage processing portion 51 and the print control portion 52; and the information processing apparatus 20 that includes the transmission processing portion 211, the determination processing portion 53, the first notification processing portion 54, the acquisition processing portion 55, the second notification processing portion 56, and the third notification processing portion 57, is another example of the image forming system of the present disclosure. In addition, the information processing apparatus 20 including the transmission processing portion 211, the determination processing portion 53, the first notification processing portion 54, the acquisition processing portion 55, the second notification processing portion 56, and the third notification processing portion 57 is an example of an information processing apparatus of the present disclosure.

In the image forming system 100, the mobile terminal 30 may be the information processing apparatus of the present disclosure. In this case, the application program stored in the storage portion 34 of the mobile terminal 30 may be the printer driver. In addition, the image forming system 100 may not include the information processing apparatus 20.

The image forming system 100 may include an information processing apparatus (a print server) that inputs a print job transmitted from the information processing apparatus 20 to the image forming apparatus 10. In this case, the print server may include the storage processing portion 51, the print control portion 52, the determination processing portion 53, the first notification processing portion 54, the acquisition processing portion 55, the second notification processing portion 56, the third notification processing portion 57, and the specific storage area 81.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
   a storage processing portion configured to store print jobs transmitted from information processing apparatuses, into a storage portion;
   a print control portion configured to control an execution order of the print jobs stored in the storage portion for execution by an image forming apparatus;
   a first notification processing portion configured to notify a first user of an information processing apparatus that is a transmission source of a first print job, of a shortage of a consumable, the first print job being, among the print jobs stored in the storage portion, a print job for which the consumable that is necessary for execution of the print job will become insufficient during a stop possible period of the print job, the stop possible period being a time period in which the execution of the print job can be stopped; and
   a second notification processing portion configured to notify a second user of an information processing apparatus that is a transmission source of a second print job, of the shortage of the consumable and presence of the first print job, the second print job being, among the print jobs stored in the storage portion, a print job that is to be executed later than the first print job in the execution order, and uses the consumable that will become insufficient during the stop possible period of the first print job, wherein
   the second notification processing portion notifies the second user of the presence of the first print job at a timing when the second notification processing portion notifies the second user of the shortage of the consumable.

2. The image forming system according to claim 1, wherein
   the print control portion controls the execution order of the print jobs stored in the storage portion such that the print jobs are executed in an order of storage into the storage portion,
   the first notification processing portion notifies the first user of the shortage of the consumable, at a timing when the first print job is stored in the storage portion,
   the image forming system further comprises an acquisition processing portion configured to acquire position information that indicates a current position of the first user, and
   the second notification processing portion notifies the second user of the position information acquired by the acquisition processing portion, as well as the shortage of the consumable and the presence of the first print job.

3. The image forming system according to claim 2, wherein
   the second notification processing portion notifies the second user of the position information acquired by the acquisition processing portion, as well as the shortage of the consumable and the presence of the first print job, by displaying a screen that includes:
      an image indicating an installation position of the image forming apparatus;
      an image indicating a storage location of the consumable; and
      an image indicating the current position of the first user based on the position information acquired by the acquisition processing portion.

4. The image forming system according to claim 2, wherein
   the acquisition processing portion acquires the position information at a predetermined interval, and
   each time the acquisition processing portion acquires the position information, the second notification processing portion notifies the second user of the position information.

5. The image forming system according to claim 2, wherein
   each time the second notification processing portion notifies the second user of the shortage of the consumable and the presence of the first print job, the first notification processing portion notifies the first user of an amount of the consumable that is to be consumed by the second print job.

6. The image forming system according to claim 1, further comprising:
   a third notification processing portion configured to, when, after the second notification processing portion notified the second user of the shortage of the consumable and the presence of the first print job, the consumable has been replenished, notify the second user that the consumable has been replenished.

7. The image forming system according to claim 1, wherein
   in a case where an execution timing of the first print job has come, when there is a third print job that is to be executed later than the first print job in the execution order and does not use the consumable that will become insufficient during the stop possible period of the first print job, the print control portion suspends an execution of the first print job and executes the third print job.

8. An information processing apparatus comprising:
a transmission processing portion configured to transmit a print job to an image forming apparatus so that the print job can be executed by the image forming apparatus;
a first notification processing portion configured to, when the print job transmitted by the transmission processing portion is a first print job, notify a first user of the information processing apparatus of a shortage of a consumable, the first print job being a print job for which the consumable that is necessary for execution of the print job will become insufficient during a stop possible period of the print job, the stop possible period being a time period in which the execution of the print job can be stopped; and
a second notification processing portion configured to, when the print job transmitted by the transmission processing portion is a second print job that is to be executed later than the first print job in an execution order in the image forming apparatus, and uses the consumable that will become insufficient during the stop possible period of the first print job, notify a second user of the information processing apparatus of the shortage of the consumable and presence of the first print job, wherein
the second notification processing portion notifies the second user of the presence of the first print job at a timing when it notifies the second user of the shortage of the consumable.

9. A notification method implemented in an image forming system, the notification method comprising:
storing print jobs transmitted from information processing apparatuses, into a storage portion;
controlling an execution order of the print jobs stored in the storage portion for execution by an image forming apparatus;
notifying a first user of an information processing apparatus that is a transmission source of a first print job, of a shortage of a consumable, the first print job being, among the print jobs stored in the storage portion, a print job for which the consumable that is necessary for execution of the print job will become insufficient during a stop possible period of the print job, the stop possible period being a time period in which the execution of the print job can be stopped; and
notifying a second user of an information processing apparatus that is a transmission source of a second print job, of the shortage of the consumable and presence of the first print job, the second print job being, among the print jobs stored in the storage portion, a print job that is to be executed later than the first print job in the execution order, and uses the consumable that will become insufficient during the stop possible period of the first print job, wherein
the second user is notified of the presence of the first print job at a timing when the second user is notified of the shortage of the consumable.

* * * * *